Jan. 2, 1951　　　　　F. L. BUTTON　　　　　2,536,625
VERNIER READING DEVICE
Filed July 14, 1948　　　　　　　　　　　　2 Sheets-Sheet 1
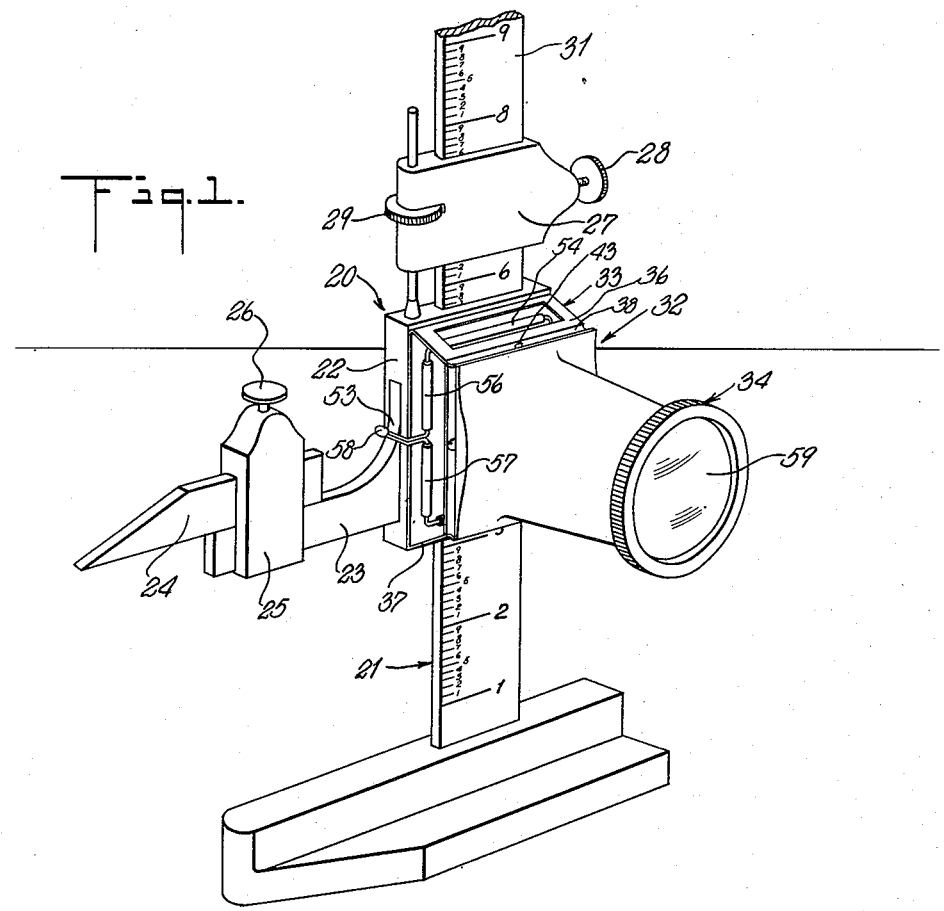
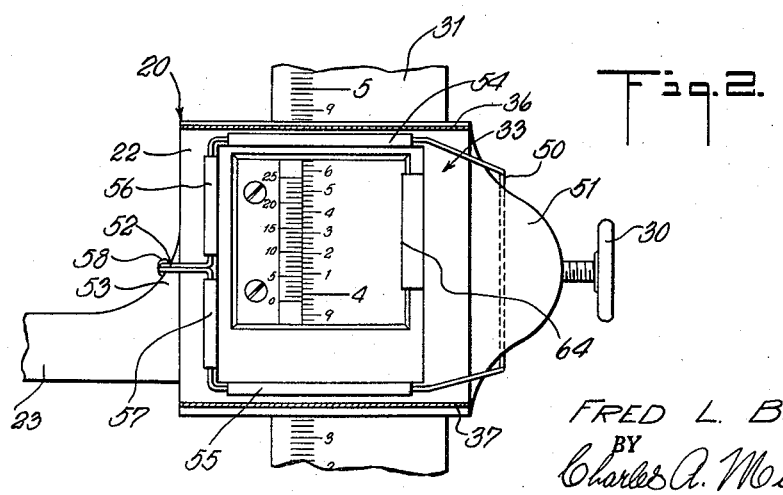
INVENTOR.
FRED L. BUTTON
BY Charles A. Morton
ATTORNEY Jan. 2, 1951 F. L. BUTTON 2,536,625
VERNIER READING DEVICE
Filed July 14, 1948 2 Sheets-Sheet 2

INVENTOR.
FRED L. BUTTON
BY
Charles A. Morton
ATTORNEY

Patented Jan. 2, 1951

2,536,625

UNITED STATES PATENT OFFICE 2,536,625

VERNIER READING DEVICE

Fred L. Button, North Bergen, N. J., assignor of one-third to Charles A. Morton, Baldwin, and one-third to Lee Coyne, Rockville Centre, N. Y.

Application July 14, 1948, Serial No. 38,694

4 Claims. (Cl. 88—39)

This invention relates to a vernier reading device and more particularly to a magnifying attachment adapted to be readily associated with a vernier to facilitate the more rapid and accurate manipulation of the vernier scale.

Heretofore it has been common machine shop practice to use a jeweller's loop for reading the scale setting of a vernier. Many machinists cannot hold the loop in the eye with the facial muscles, hence when the scale setting requires the readjustment of the vernier, it is necessary to remove the loop from the eye in order to free both hands to hold and operate the vernier.

The object of this invention is a magnifying attachment which can be detachably secured to any standard vernier, so that the machinist retains both hands free at all times to adjust the vernier and to simultaneously observe the scale reading.

Another object is a lens assembly which can be interchangeably associated with different verniers and quickly attached thereto and detached therefrom.

In the drawings comprising two sheets of seven figures numbered Figs. 1 to 7 inclusive, one suggested embodiment of the invention is illustrated;

Fig. 1 is a perspective view of a height gauge with its graduated fixed scale arm partially broken away, showing how the magnifying attachment is associated with a vernier;

Fig. 2 is a fragmentary view of a part of a vernier showing the clamp assembly of the magnifying attachment;

Like reference characters designate corresponding parts throughout the several figures of the drawings.

Figure 3:
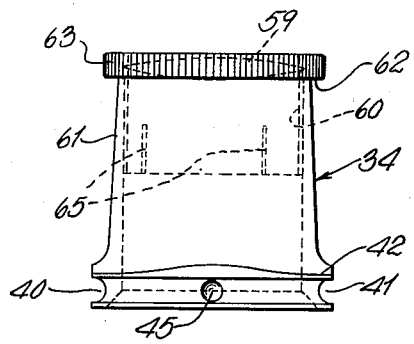
Fig. 3 is a side view of the magnifier assembly of the magnifying attachment.
Figure 4:
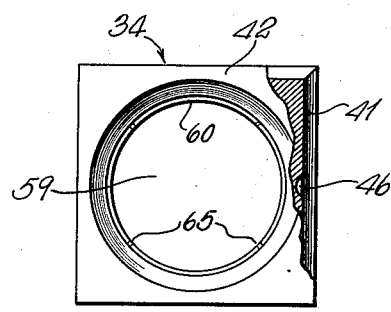
Fig. 4 is a top plan view thereof partially in section.
Figure 5:
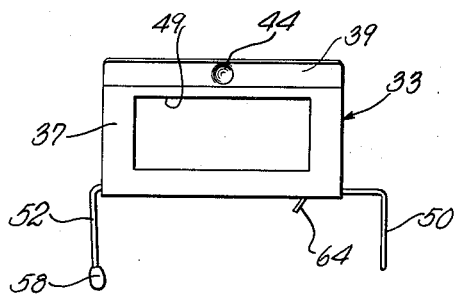
Fig. 5 is a side view of the clamp assembly of the magnifying attachment.
Figure 6:
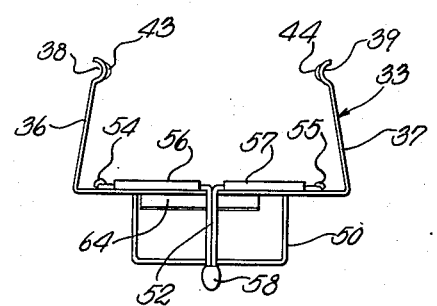
Fig. 6 is an end view thereof.

For purposes of illustration, the vernier 20 of a height gauge 21 is shown, although the invention is equally adaptable to a vernier caliper.

The vernier 20 includes the sliding scale 22 of the height gauge 21, and may be provided with an extension arm 23 whereon a scriber 24 is adjustably supported as by means of the scriber clamp 25 and the clamping screw 26.

The movement of the sliding scale 22 is controlled by the usual adjusting screw block 27 and its clamping screw 28 and the vernier adjusting screw 29. A clamping screw 30 locks the sliding scale 22 to the arm of the graduated fixed scale 31 of height gauge 21 to prevent any premature change in the scale reading.

Figure 7:
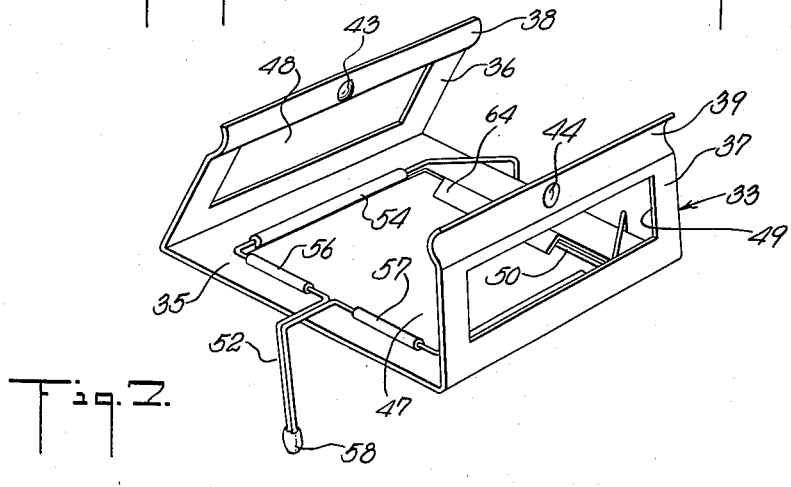
Fig. 7 is a perspective view of the clamp assembly.

The vernier reading device 32 (Fig. 1) includes the clamp assembly 33 (Fig. 7), and the magnifier assembly 34 (Fig. 3), which assemblies may be conveniently detachably secured together in any preferred manner.

The clamp assembly 33 includes a flat fenestrated base frame 35 made of any suitable resilient material such as phosphor bronze, spring steel, or the like. Base frame 35 is adapted to overlie the sliding scale 22. The opposite fenestrated ends of the frame 35 are extended and bent upwardly and inwardly towards each other to form the upstanding bifurcated oppositely spaced resilient jaw members 36 and 37. The marginal extremity of each jaw member 36 and 37 may be indented to define the oppositely disposed concavo-convex ribs 38 and 39 which are purposely shaped to register with the oppositely disposed guide channels 40 and 41 of the base flange 42 of the magnifier assembly 34. The inwardly projecting oppositely disposed dimples 43 and 44 may be formed in the ribs 38 and 39 so as to register in the dimpled recesses 45—46 etc., formed in the guide channels 40—41. Thus to detachably mount the magnifier assembly 34 upon the clamp assembly 33, the base flange 42 of the magnifier assembly 34 is inserted between the bifurcated resilient jaw members 36 and 37 of the clamp assembly 33 which are thereby forced apart under increasing spring tension to allow the ribs 38—39 to register in the guide channels 40—41 until the dimples 43 and 44 register with the dimpled recesses 45 and 46 and center the lens 59 of the magnifier assembly 34 over the window opening 47 of the base frame 35. The marginal edge 64 of the window opening may be bent at an angle to conform to and to seat against the bevelled inner edge of the jaw of sliding scale 22.

The resilient jaw members 36 and 37 are fenestrated at 48 and 49 respectively to permit the free passage of light to illuminate the scale of the vernier and the graduated fixed scales, so that the frame of the clamp assembly 33 permits free passage of light therethrough on all sides to the scales of the vernier 20 and of the scale arm 31.

The clamp assembly 33 may be detachably mounted upon the jaw of the sliding scale 22 in any preferred manner. One simple device for doing this is shown in the drawings. It includes a wire loop 50 for hooking around the shoulder 51 of the frame of the sliding scale 22, and a spring clip 52 for frictionally engaging the edge face of the oppositely disposed side wall 53 of the frame of scale 22. The loop 50 and spring clip 52 are designed to co-operate so that when the wire loop 50 is properly looped around the shoulder 51 of the frame of the sliding scale 22, the spring clip 52 may be sprung into place against the edge face of the wall 53. The wire loop 50 and the spring clamp 52 may be formed from one single length of steel wire of suitable gauge bent to conform generally to the shape of the window opening 47 formed in the fenestrated base frame 35. The free ends of the length of steel wire are brought together and bent downwardly to form the spring clip 52. The free ends of wire of the spring clip 52 may be suitably end-capped as by a ball-headed thimble 58. The wire loop may be anchored to the base frame 35 in any desired manner as by rolling certain marginal edges of the window opening 47 upwards and outwards over the wire loop to form the rolled edges 54, 55, 56, and 57 which enclose sections of the steel wire loop and anchor it to the base frame 35.

Since the spacing between the spring jaws 36 and 37 of each clamp assembly 33 is substantially the same, any magnifier assembly 34 may be used interchangeably with any clamp assembly 33. The base flange 42 of each magnifier assembly 34 is preferably square, and is provided with guide channels (40, 41) in all four edge faces so that the ribs 38 and 39 will register in any oppositely disposed pair of guide channels 40 and 41 in base flange 42. The magnifier assembly 34 includes a lens 59 which may either be mounted in the free end of the barrel 61 of the magnifier assembly 34 or may be mounted in one end of an inner sleeve 60 to form an eye-piece which is adapted to telescope in the barrel 61 with a snug fit. When the two-piece construction is used, the inner sleeve 60 is provided with an annular shoulder 62 which overhangs and abuts the end of the barrel 61 thus limiting the telescopic movement of inner sleeve 60. The edge face of the annular shoulder 62 is milled at 63, and the inner sleeve 60 is split at 65 to snugly engage the inner wall of the barrel 61 with a spring fit.

The height of the jaw members 36 and 37 of the clamp assembly 33 and the length of the barrel 61 are such, that when the magnifier assembly 34 is properly mounted upon the clamp assembly 33, the perpendicular distance between the lens 59 and the vernier scale corresponds to the focal length of the lens.

Each height gauge and vernier caliper may be equipped with one of the clamp assemblies 33; and a sufficient number of interchangeable magnifier assemblies 34 may be furnished, so that whenever a machinist desires to observe a vernier scale reading he mounts one of the magnifier assemblies 34 between the spring jaws 36 and 37 of the clamp assembly 33 associated with the height gauge or vernier caliper which he desires to use and adjusts the vernier in the conventional manner while simultaneously observing the changes in the scale reading. The machinist's two hands are entirely free at all times to manipulate the vernier mechanism while simultaneously observing any changes in the scale reading.

What is claimed is:

1. The combination with a magnifier assembly having a base flange of means for attaching said assembly to a vernier comprising a spring clip removably embracing the vernier, said spring clip including a flat base plate having a framed opening therein forming a window through which the scale of the vernier is visible, a pair of oppositely disposed fenestrated resilient jaws merging with the oppositely disposed side edges of the frame opening and in continuation thereof said jaw members extending upwardly from said fenestrated base plate in oppositely spaced relation, and the base flange of said magnifier assembly being detachably engaged by and between the free ends of the resilient jaws to support the lens of the magnifier assembly at correct focal distance above the scale of the vernier.

2. A reading device for a vernier provided with a set screw for locking the vernier comprising a flat base plate overlying the vernier, said base plate having a framed opening therein forming a window through which the vernier scale is clearly visible, a spring clip secured to the base plate for looping around the vernier to detachably attach the base plate to the vernier and permit the head of the set screw to project through the spring clip, the oppositely disposed marginal edges of said base plate also being fenestrated, said fenestrated marginal edges being upwardly bent to define a pair of oppositely spaced fenestrated resilient jaw members for permitting free passage of light to the scale of the vernier, and a magnifier assembly including a magnifying lens mounted between the free ends of said resilient jaw members and detachably engaged by and between said resilient jaw members under tension thereof to support said lens at correct focal distance above the scale of the vernier.

3. A reading aid for a vernier having a frame provided with a set screw for locking the vernier comprising a flat base plate fashioned from resilient material, said base plate having an opening therein forming a window through which the scale of the vernier is visible, a wire spring clip overlying certain of the marginal edges of the base plate adjoining said window opening, said marginal edges being rolled back and around said spring clip to anchor the spring clip upon the base plate, said spring clip being adapted to loop around the set screw to detachably attach the base plate to the vernier, said base plate having two oppositely disposed fenestrated side walls extending from the base plate to form a pair of fenestrated resilient jaw members, a magnifier assembly including a lens, said magnifier assembly being mounted between and detachably engaged under spring tension by said resilient jaw members to support said lens at correct focal distance relative to the scale of the vernier.

4. In a reading aid for a vernier provided with a shoulder and an edge face disposed opposite said shoulder and in combination, a plate made of resilient metal, said plate having a flat base with an opening therein forming a window frame through which the scale of the vernier is visible when the base of the plate rests upon, and is in cooperative registry with, the vernier, a length of resilient wire bent to conform generally to the shape of the window opening and to loop around the shoulder of the vernier, the free ends of the wire being bent to form an L-shaped spring clip, certain of the marginal edges of the plate adjoining the window opening being rolled over and around the wire to attach the wire form to the base plate, said wire looping around the shoulder of the vernier, and said spring clip engaging the oppositely disposed edge face of the vernier, to detachably attach said plate to the vernier and center its scale within the window opening, fenestrated side walls projecting from the opposite ends of said plate to define a spaced pair of oppositely disposed fenestrated resilient jaw members, said jaw members terminating in a pair of oppositely disposed convex ribs, a magnifier assembly including a barrel, concave guide channels formed in the edge faces of the lower end of said barrel, said guide channels being positioned between and brought into co-operative registry with said ribs under the spring tension of said jaw members to detachably support said barrel above the scale of the vernier, and a lens adjustably slidably mounted in said barrel to position said lens at the correct focal distance above the scale of the vernier.

FRED L. BUTTON.

REFERENCES CITED

The following references are of record in the file of this patent:

UNITED STATES PATENTS

| Number | Name | Date |
|---|---|---|
| 1,396,607 | Von Post | Nov. 8, 1921 |
| 1,424,807 | Dieckmann | Aug. 8, 1922 |
| 1,773,899 | Kaler | Aug. 26, 1930 |
| 1,823,828 | Gooch | Sept. 15, 1931 |
| 2,367,872 | Kamienski | Jan. 23, 1945 |